United States Patent Office 3,041,188
Patented June 26, 1962

3,041,188
ANTIFOULING PAINT
Ikuzo Kageyama, Toyonaka, and Shunichi Nakanishi, Kobe, Japan, assignors of one-half to Osaka Kinzoku Kogyo Company, Limited, Osaka, and one-half to Kansai Paint Company, Limited, Amagasaki, Japan
No Drawing. Filed Sept. 18, 1959, Ser. No. 840,821
12 Claims. (Cl. 106—15)

This invention relates to an antifouling paint of entirely new type.

One object of this invention is to provide an antifouling paint which can be stored as long a period as possible without precipitation and decomposition.

Another object of the invention is to provide an antifouling paint which is substantially harmless to the human body.

A further object of the invention is to provide an antifouling paint, the film of which retains antifouling property and toxicity for a long period of time.

The antifouling paint of this invention comprises as the main ingredient one or more compounds of 5-hydro-10-fluorophenarsazine and its derivatives having the structural formula

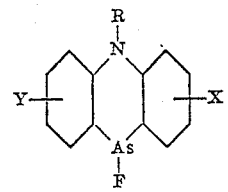

where R is a member selected from the group consisting of hydrogen atoms and alkyl and acyl radicals, and each of X and Y represents from one to four members selected from the group consisting of hydrogen and halogen atoms and hydroxyl, alkyl, halogenated alkyl, oxyalkyl, carboxyl and nitro radicals.

Representative compounds are:

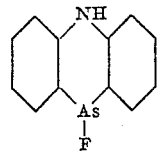

5-hydro-10-fluorophenarsazine

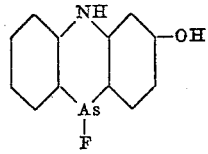

3-oxy-5-hydro-10-fluorophenarsazine

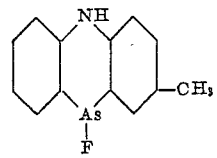

2-methyl-5-hydro-10-fluorophenarsazine

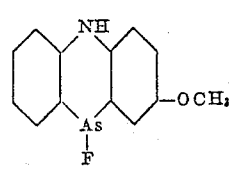

2-methoxy-5-hydro-10-fluorophenarsazine

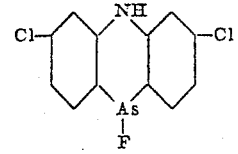

3.7-dichloro-5-hydro-10-fluorophenarsazine

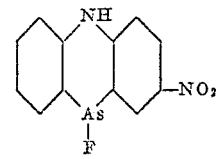

2-nitro-5-hydro-10-fluorophenarsazine

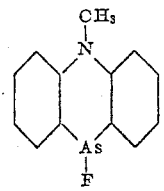

5-methyl-10-fluorophenarsazine

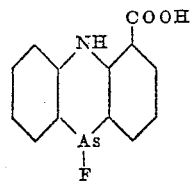

4-carboxy-5-hydro-10-fluorophenarsazine

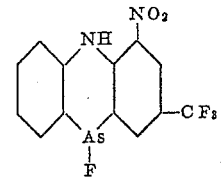

2-trifluoromethyl-4-nitro-5-hydro-10-fluorophenarsazine

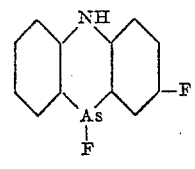

2.10-difluoro-5-hydrophenarsazine

Prior to the instant invention, it has never been practised to obtain the aforesaid compounds of 5-hydro-10-fluorophenarsazine and its derivatives, and the toxicity and other chemical, physical and biological properties thereof are little known. In this invention, however, said compounds are obtained, for instance, in the following manner:

That is to say, an aqueous solution of sodium hydroxide is mixed with one of 5-hydro-10-chlorophenarsazine, 5-hydro-10-bromophenarsazine and 5-hydro-10-iodophenarsazine and their derivatives, having R, X and Y radicals as shown in the structural formula

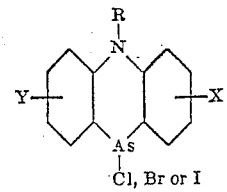

where R is a member selected from the group consisting of hydrogen atoms and alkyl and acyl radicals, and each of X and Y represents a member, 1 to 4 inclusive, of the same and different species selected from the group consisting of hydrogen and halogen atoms and hydroxyl, alkyl, halogenated alkyl, oxyalkyl, carboxyl and nitro radicals; and the resulting 5.10-dihydrophenarsazine-10-oxide or its derivative is reacted with hydrogen fluoride to obtain a desired compound of 10-fluorophenarsazine of this invention.

Generally speaking, there is little similarity between fluorides and other halides. In many instances, the two groups are diametrically opposed to each other in chemical, physical and biological properties as is the case with fluoroacetate and dichlorodifluoromethane. So is the case with the 10-fluorophenarsazine compounds of this invention and the other 10-halogenophenarsazine compounds having chlorine, bromine and iodine atoms at position 10, and the paint consisting of the latter compounds cannot be recommended as an ideal antifouling composition.

Unlike the other 10-halogenophenarsazine compounds, in other words, the 10-fluorophenarsazine compounds of the instant invention have a more pronounced chemical stability and a smaller vapor pressure, possessing no sneezing property. Said compounds of this invention are furthermore insoluble in water and organic solvents. Oral and cutaneous toxicity to the mammals is negligible, whereas antifouling effects upon fouling organisms are much pronounced.

It is well known that various phenarsazine compounds which are structurally similar to the 10-fluorophenarsazine compounds of this invention had been studied and employed as a poison gas in World War I, and it is reported that the adamsite (5-hydro-10-chlorophenarsazine) brought death to the human body within 30 minutes in the order of 0.65 g./m.$^3$ or within 10 minutes in the order of 3 g./m.$^3$. LD50 thereof to mice is orally 16 mg./kg. Accordingly, said phenarsazine compounds are of little use for practical purposes, because of insurmountable difficulties in preparation, treatment and safety measures. The compounds of this invention, however, do not show such mortal toxicity. They are substantially harmless to the human body. When applied orally to mice, LD50 was 100 mg./kg. When applied to the skin or smoked in the air, no toxicity was observed in the mice in either experiments.

Thus, one feature of this invention is chemical stability. The toxic property is retained effective in sea water for many months, and the prepared paint can be stored for a long period of time without decomposition.

Another feature of the invention is lack of corrosive property. Unlike the conventional paints containing compounds of heavy metals like copper and mercury, the paint of this invention is applicable even to the light metal vessels, and can be stored in the ordinary containers without causing any corrosion.

Another feature of the invention is that, unlike the conventional toxic ingredients soluble in water or organic solvents, the ingredient of the instant invention has no property to rise to the surface of the film, and the film does not get soft or brittle. Although insoluble in water and organic solvents, the toxic ingredient of this invention disperses in the film uniformly because of its great affinity with organic vehicles.

Another feature of the invention is lack of sneezing property and of toxicity to the human body. This fact greatly facilitates the preparation and application of the paint, and the efficiency of coating operation is thereby much improved, together with the efficiency of the removing operation of old film for repainting.

These features of this invention described hereinbefore constitute the most pronounced properties of the paint of the same, which cannot be expected of with other paints consisting of 10-halogenophenarsazine compounds other than the 10-fluorophenarsazine compounds of this invention.

A further feature of the instant invention is that the paint of the same does not yield any precipitates, because of the great affinity of the ingredient with organic vehicles and the suitable specific gravity. Spray coating is therefore employable with no precipitation.

A still further feature of the invention is that a number of paints of various colors are obtainable, because the main ingredients of the instant invention is much lighter in color than other compounds or heavy metals like copper and mercury.

Because of the pronounced chemical stability, furthermore, the toxic ingredient of this invention is not inactivated by the action of soluble sulfide contained in the used liquor released from the chemical factories.

The 10-fluorophenarsazine compounds of this invention are all obtained in the form of fine particles. Number and species of the radicals substituting R, X and Y in the aforesaid structural formula do not affect in any way the antifouling property of the paint consisting of said compounds.

The antifouling paint of this invention is obtained by dispersing in a vehicle at least one of said 10-fluorophenarsazine compounds with or without pigment. As the vehicle are employed such known agents as oleoresinous varnish, tar varnish, pitch varnish and natural and synthetic resin varnish and their emulsions. Other toxic ingredients known in the art may be mixed in the paint of this invention.

*Example 1*

| | Parts |
|---|---|
| 5-hydro-10-fluorophenarsazine | 15 |
| Indian red | 10 |
| Barium sulfate | 15 |
| Oleoresinous varnish | 60 | described in Example 1 of Patent 2,390,408 issued December 4, 1945. This varnish consists of:

| | Parts by weight |
|---|---|
| Ester gum | 7.4 |
| Tung oil | 7.4 |
| Linseed oil | 2.8 |
| Xylol | 25.4 |
| Mineral spirit | 17.0 |

*Example 2*

| | Parts |
|---|---|
| 5-hydro-10-fluorophenarsazine | 30 |
| Polyvinylchloride varnish | 70 | described in Formula 121 in MIL-P-15,931A dated February 15, 1952, and having the composition of:

| | Parts by weight |
|---|---|
| Rosin (grade WW, spec. LLL-R-626) | 8.6 |
| Vinyl resin | 8.6 |
| Tricresyl phosphate (spec. TT-T-656) | 3.2 |
| Methyl isobutyl ketone (spec. TT-M-268) | 29.6 |
| Xylene (spec. TT-X-916) | 20.0 |

*Example 3*

| | Parts |
|---|---|
| 5-hydro-2.10-difluorophenarsazine | 20 |
| Phthalocyanine blue | 1 |
| Titanium dioxide | 9 |
| Barium sulfate | 10 |
| Rosin varnish | 60 | described in Formula 16X in MIL-P-1,226A dated April 17, 1952 and having the composition of:

| | Parts by weight |
|---|---|
| Rosin (grade WW, WG, or N, spec. LLL-R-626) | 28.1 |
| Hydrogenated methyl-abietate (spec. MIL-M-15,174) | 14.1 |
| Naphtha coal-tar (type A, spec. MIL-N-15,178) | 8.4 |
| Paint thinner (grade 1, spec. TT-T-291) | 9.4 |

Example 4

| | Parts |
|---|---|
| 5-methyl-10-fluorophenarsazine | 20 |
| Titanium dioxide | 15 |
| Polyvinylchloride varnish | 65 | of the same formula as used in Example 2 above.

In each of the above mentioned examples, all materials were mixed and kneaded in a ball mill to obtain the desired paint. The paint thus obtained was applied to an aluminum plate which was previously coated with a priming paint, and the plate was immersed on Osaka Bay. The plate was found completely protected in the sea water for 12 months from the adhesion of any fouling organisms, and no corrosion was observed on the plate.

The paint of this invention is not only applicable to the bottom of the vessel, but to the boot-top area of the hull, pontoons, mooring buoys and other instruments which are liable to catch fouling organisms. The paint can also be profitably employed in the hydroelectric power generating industry, as the paint is discovered very effective for preventing the waterways from the adhesion of larvae of macronema or hydropsyche.

Various changes and modifications may be made in the method of preparing the compounds of 5-hydro-10-fluorophenarsazine and its derivatives and the principles of composition of this invention described hereinbefore, as will be apparent to those skilled in the art, without departing from the spirit and scope of the same. It is accordingly our intention that the invention be not limited by any of the details of description unless otherwise specified and be construed rather broadly within the scope and intent of the invention as set forth in the accompanying claims.

What we claim is:

1. In an antifouling paint containing an anti-fouling substance and a varnish base vehicle the improvement wherein said antifouling substance consists essentially of an effective amount of at least one compound of the formula

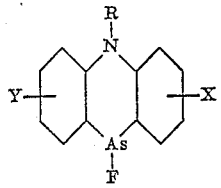

wherein R is a member selected from the group consisting of hydrogen atom, alkyl radical and acyl radical; each of X and Y represents from one to four members selected from the group consisting of hydrogen atom, halogen atom, hydroxyl radical, alkyl radical, halogenated alkyl radical, alkoxy radical, carboxyl radical and nitro radical.

2. In an antifouling paint containing an antifouling substance and a varnish base vehicle, the improvement wherein said antifouling substance consists essentially of an effective amount of 5-hydro-10-fluorophenarsazine.

3. In an antifouling paint containing an antifouling substance and a varnish base vehicle, the improvement wherein said antifouling substance consists essentially of an effective amount of 3,7-dichloro-5-hydro-10-fluorophenarsazine.

4. In an antifouling paint containing an antifouling substance and a varnish base vehicle, the improvement wherein said antifouling substance consists essentially of an effective amount of 2-nitro-5-hydro-10-fluorophenarsazine.

5. In an antifouling paint containing an antifouling substance and a varnish base vehicle, the improvement wherein said antifouling substance consists essentially of an effective amount of 2-methyl-5-hydro-10-fluorophenarsazine.

6. In an antifouling paint containing an antifouling substance and a varnish base vehicle, the improvement wherein said antifouling substance consists essentially of an effective amount of 2, 10-difluoro-5-hydrophenarsazine.

7. In an antifouling paint containing an antifouling substance and a varnish base vehicle, the improvement wherein said antifouling substance consists essentially of an effective amount of 2-trifluoromethyl-4-nitro-5-hydro-10-fluorophenarsazine.

8. In an antifouling paint containing an antifouling substance and a varnish base vehicle, the improvement wherein said antifouling substance consists essentially of an effective amount of 5-methyl-10-fluorophenarsazine.

9. In an antifouling paint containing an antifouling substance and a varnish base vehicle, the improvement wherein said antifouling substance consists essentially of an effective amount of 3-oxy-5-hydro-10-fluorophenarsazine.

10. In an antifouling paint containing an antifouling substance and a varnish base vehicle, the improvement wherein said antifouling substance consists essentially of an effecitve amount of 2-methoxy-5-hydro-10-fluorophenarsazine.

11. In an antifouling paint containing an antifouling substance and a varnish base vehicle, the improvement wherein said antifouling substance consists essentially of an effective amount of 4-carboxy-5-hydro-10-fluorophenarsazine.

12. The improvement described in claim 1, wherein said antifouling substance is present in the amount of 15 to 30 parts by weight in 100 parts of the paint.

References Cited in the file of this patent
UNITED STATES PATENTS 1,696,539    Bradner _____ Dec. 25, 1928

OTHER REFERENCES

Condensed Chemical Dictionary, 4th ed., Reinhold Publishing Corp., N.Y., 1950, page 512.